UNITED STATES PATENT OFFICE.

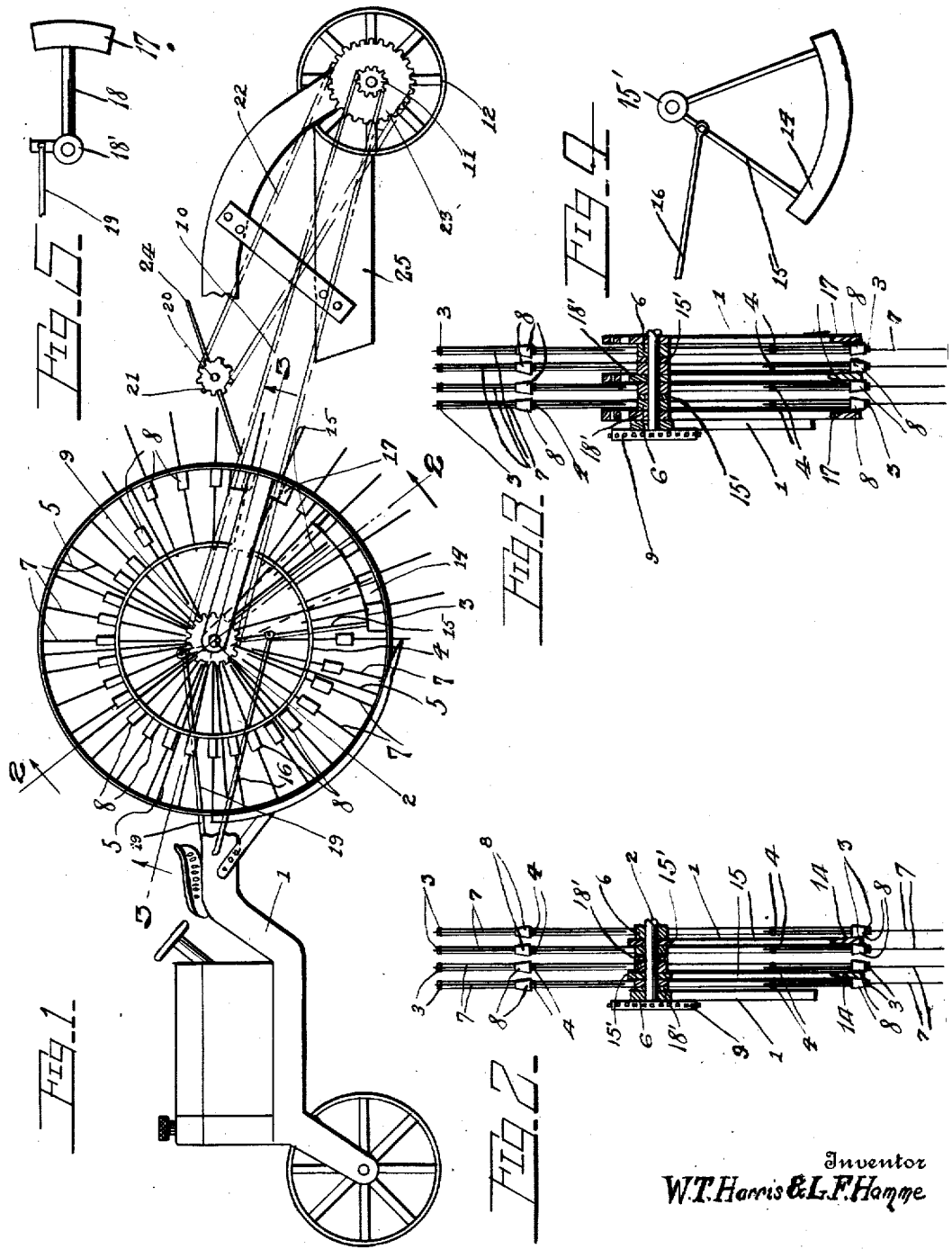

WILLIAM T. HARRIS, OF VIRGILINA, VIRGINIA, AND LEE F. HAMME, OF OXFORD, NORTH CAROLINA.

COTTON-PICKER.

1,334,369.  Specification of Letters Patent.  Patented Mar. 23, 1920.

Application filed September 18, 1919. Serial No. 324,368.

*To all whom it may concern:*

Be it known that we, WILLIAM T. HARRIS and LEE F. HAMME, citizens of the United States, residing, respectively, at Virgilina and Oxford, in the counties of Halifax and Granville, States of Virginia and North Carolina, have invented a new and useful Cotton-Picker, of which the following is a specification.

This invention relates to machines for picking cotton, one of its objects being to provide a gang of rotating units adapted to be drawn over a row of plants and each unit including a plurality of needles adapted to be dropped into engagement with the plants so as to engage the fibers of the bottom.

Another object is to provide means whereby the needles, when dropped to active positions, will be rotated by the forward movement of the machine thereby to wrap the cotton fibers thereupon and pull them from the bolls.

A still further object is to provide simple and efficient means for rotating the needles in the reverse direction after they have been elevated from the plants, thereby to loosen the fibers thereon and allow them to be doffed readily.

Another object is to provide units which are simple in construction, compact and efficient, formed of few parts, and will not readily get out of order.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention.

In the accompanying drawings the preferred form of the invention has been shown.

In said drawings

Figure 1 is a view partly in side elevation and partly in section of the complete machine, parts being broken away.

Fig. 2 is a section on line 2—2, Fig. 1.

Fig. 3 is a section on line 3—3, Fig. 1.

Fig. 4 is a detail view of one of the lower arcuate tracks.

Fig. 5 is a detail view of one of the rear arcuate rails.

Referring to the figures by characters of reference, 1 designates a wheel supported frame adapted to be propelled by motor or otherwise along a row of cotton plants and journaled on this frame is a transverse shaft 2 to which are secured the picking units of the machine. Each picking unit includes a narrow wheel formed of an outer rim 3 and an inner rim 4, the said rims being connected at desired intervals by spokes 5 or the like which also connect the rims to a hub 6 secured to and adapted to rotate with the shaft 2. Needles 7 are radially disposed in each wheel and are adapted to slide and rotate within the rims of the wheel, each needle having a spool 8 secured thereto between the rims and movable against said rims to limit the sliding movement of the needle radially of the wheel toward or from the hub.

The several wheels of the units are arranged close together and side by side and a sprocket 9 is secured to the shaft 2 and is driven by a chain 10 and sprocket 11 from one of the supporting wheels 12 so that as the machine moves forward the picking units will be rotated.

Fixedly connected to the frame 1 and extending under the front lower quarter of each picking unit is a shield 13 which is concentric with the shaft 2 and extends slightly rearwardly past the vertical center of the units. This shield is close to the outer rims 3 and constitutes a support for the needles 7 as they are moving downwardly preparatory to dropping into the plants under the machine.

Supported from the shaft between the wheels of the units and close to and concentric with the outer rims 3 are arcuate tracks 14, each of these tracks being engaged by the spools 8 of two adjoining units, as shown particularly in Fig. 2. The rails can be formed with thin side faces diverging outwardly and can be held against rotation with the shaft 2 by any suitable means, as, for example, braces connecting the arms 15 of the rails with the frame 1, these braces being shown at 16. Additional short rails 17 having outwardly diverging faces are arranged between the back portions of the wheels of the units and in line with the spaces between the rails 14 and these short rails are connected to the shaft 2 by arms 18 loose on the shaft and braced to the frame 1 by rods 19 or in any other manner desired. It will be noted that the shaft 2 is adapted to rotate in the hubs 15' of the tractor rails 14 and within the hubs 18' of the rails 17.

Arranged back of the picking units is a transverse shaft 20 having a sprocket 21 receiving motion through a chain 22 from a sprocket 23 rotating with the sprocket 11. Secured to the shaft 20 are beaters 24 of suitable material adapted to wipe along the needles as they are brought to position adjacent thereto, and thus doff the cotton fiber therefrom and deposit them in a receptacle 25 carried by the frame 1.

When the machine is moved forward the picking units will rotate with the shaft 2 as already described. As the needles are brought to elevated positions they will slide downwardly until their spools 8 come against the inner rims 4 and the points of the needles are flush or substantially flush with the outer surfaces of the rims 3. During the continued rotation of the units the needles will be brought to position above the front end of the shield 13 which will support the needles as they move downwardly and rearwardly with their wheels. Each needle will ultimately slide off of the rear edge of the shield 13 and will promptly drop down into the plant thereunder and this dropping of the needle will cause the spool on the same to come into contact with one side of the adjacent rail 14 so that the rotation of the wheel of the picking unit will result in the spool rolling along the rail and rotating the needle. As before explained each rail 14 will rotate the spools of two units said spools of the two units rotating in opposite directions respectively, as will be obvious. The rotation of the spools and their needles will result in the wrapping of the cotton fiber about the needles as the needles comb through the plants and just as the needles rise out of the plants their spools will leave the rear ends of the rails and pass between and into contact with the short rails 17. The spools will roll along these short rails but as the rails 17 are located at those sides of the spool opposite the rails 14 it will be apparent that the rotation of the needles will be reversed with the result that the fibers thereon will be loosened. During this action the rotating beater will doff the fibers from the needles and throw them into the receptacle 25 from which they can be removed in any manner desired. After moving upwardly from the doffing element the needles 7 will drop back to their retracted positions in the wheels and thus be set to repeat the foregoing operation.

What is claimed is:—

1. A machine for picking cotton including a movably supported structure, a revoluble unit carried by said structure and including radial needles mounted to slide and rotate, means concentric with the unit for holding the needles retracted within the unit during a portion of their rearward movement with the unit, said needles being movable by gravity downwardly into picking positions when moved off of the concentric holding means, and coöperating means upon the needles and structure for rotating the needles when in their picking positions.

2. A machine for picking cotton including a movably supported structure, a revoluble unit carried thereby, needles radially disposed in said unit and adapted to slide and rotate therein, means for supporting the needles within the unit during the first portion of their movement under the axis of rotation of the unit, a stationary element at one side of the path of the needles, and means on the needles for engaging said element to rotate the needles when moved radially outwardly during the final portion of their movement under the axis of rotation.

3. A machine for picking cotton including a movably supported structure, a wheel revolubly mounted therein and having outer and inner rims, radial needles slidable and revoluble within the rims, an arcuate rail at one side of the wheel adjacent the outer rim, stationary means upon the structure and concentric with the outer rim for engaging the outer ends of the needles to hold the needles retracted in the wheel during the first portion of their rearward rotation with the wheel, and means upon the needles for engaging the rail during the downward movement of the needles when moved off of the stationary needle holding means, thereby to rotate said needles during the rotation of the wheel.

4. A machine for picking cotton including a rotatable series of radial needles slidably mounted, means for holding the needles against gravitation during a portion of their movement under the axis of rotation of the series, rails at opposite sides of the path of the needles and disposed one back of the other, and means on the needles and movable successively along the rails to rotate each needle in opposite directions successively during the rotation of the series.

5. The combination with rails arranged in parallel planes and one in advance of the other, of a rotatable series of radial needles, each needle being slidable radially by gravity, a revoluble element carried by each needle, and movable successively into engagement with the rails to successively rotate the needle in opposite directions during their rearward and upward movement, and means for supporting the needles in retracted positions during their downward movement with the rotating series.

6. The combination with rails arranged in parallel planes and one in advance of the other, of a wheel having inner and outer rims, radial needles slidable and revoluble in the rims, spools on the needles and between the rims for limiting the sliding movement of the needles, and means for supporting the needles with their spools elevated during the downward and rearward rotation of the needles with the series and for releasing the needles for gravitation from the outer rim of the wheel during the rearward and upward rotation of the series, said spools, during such gravitation, being movable to successively engage the rails to rotate the needles in opposite directions successively.

7. In a machine for picking cotton a wheel mounted for rotation and having inner and outer rims, radial needles slidable within the rims, spools thereon and between the rims, arcuate means for supporting the needles during a portion of their downward and rearward movement with the wheel, said needles being movable downwardly by gravity when moved off of the supporting means to position the spools adjacent the outer rim, and separate means for engagement successively by the spools for rotating the spools and needles in opposite directions successively, and doffing means for engaging the needles.

8. In a machine for picking cotton a wheel having inner and outer rims, needles slidable within the rims and radially disposed, spools on the needles and between the rims for limiting the sliding movement of the needles, means extending under a portion of the wheel for holding the needles retracted during a portion of their rearward movement under the axis of the wheel, separate rails at the sides of the path of the spools, said spools being movable to position to successively engage and roll along the rails when the needles are released from their holding means, thereby to rotate each needle in opposite directions successively, and a revoluble doffer for engaging the needles during their rotation by one of the rails.

In testimony that we claim the foregoing as our own, we have hereto affixed our signatures in the presence of two witnesses.

WILLIAM T. HARRIS.
LEE F. HAMME.